United States Patent
Fujioka

(10) Patent No.: US 7,647,067 B2
(45) Date of Patent: Jan. 12, 2010

(54) INFORMATION PROCESSING APPARATUS AND A CELLULAR PHONE

(75) Inventor: Takashi Fujioka, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1324 days.

(21) Appl. No.: 10/995,854

(22) Filed: Nov. 23, 2004

(65) Prior Publication Data

US 2005/0132373 A1   Jun. 16, 2005

(30) Foreign Application Priority Data

Nov. 27, 2003   (JP) ............................. 2003-396654

(51) Int. Cl.
*H04M 1/00* (2006.01)
*G06F 9/46* (2006.01)

(52) U.S. Cl. ................. 455/550.1; 455/556.2; 455/557; 718/100; 718/103; 718/107

(58) Field of Classification Search ............. 455/550.1, 455/552.1, 556.1, 556.2, 557; 718/100, 103, 718/105, 106, 107
See application file for complete search history.

(56) References Cited

U.S. PATENT DOCUMENTS 5,974,219 A * 10/1999 Fujita et al. .................... 386/52

| | | | |
|---|---|---|---|
| 6,078,944 A * | 6/2000 | Enko et al. ................... 718/105 |
| 6,338,139 B1 * | 1/2002 | Ando et al. .................. 713/168 |
| 7,167,725 B1 * | 1/2007 | Nakamura et al. .......... 455/557 |
| 7,333,406 B2 * | 2/2008 | Miyake et al. ........... 369/47.11 |
| 7,356,370 B2 * | 4/2008 | Koike et al. ................... 700/18 |
| 7,447,576 B2 * | 11/2008 | Ban et al. ...................... 701/36 |
| 7,472,388 B2 * | 12/2008 | Fukunari et al. ............ 718/100 |
| 2004/0239992 A1 * | 12/2004 | Kawai et al. ............... 358/1.15 |
| 2005/0120358 A1 * | 6/2005 | Nikami et al. .............. 719/318 |
| 2006/0013087 A1 * | 1/2006 | Miyake et al. ........... 369/47.11 |
| 2006/0291812 A1 * | 12/2006 | Takezaki ..................... 386/95 |

FOREIGN PATENT DOCUMENTS

DE    101 43 983    4/2003
JP    2004013770    * 1/2004

OTHER PUBLICATIONS

Patent Abstracts of Japan, vol. 1997, No. 5, May 30, 1997 & JP 09 027187 A (Matsushita Electric Ind Co Ltd), Jan. 28, 1997.

* cited by examiner

*Primary Examiner*—Duc M Nguyen
(74) *Attorney, Agent, or Firm*—Frommer Lawrence & Haug LLP; William S. Frommer

(57) ABSTRACT

When a specified task process may mix with another more highly prioritized task process, it is aimed at accurately calculating a process time for the specified task process. A CPU 11 can simultaneously perform a plurality of task processes such as a task process to display the reproduction time during an audio reproduction process on a display 20 and a task process concerning a telephone call. A DSP 12 performs the audio reproduction process and changes a timing to notify the CPU 11 of information about the audio reproduction time in accordance with loads on the task process in the CPU 11.

6 Claims, 5 Drawing Sheets

FIG. 3

| REPRODUCTION MODE | REPRODUCTION NOTIFICATION TIME INTERVAL |
|---|---|
| 1X SPEED | 1 |
| 2X SPEED | 2 |
| 3X SPEED | 3 |
| ..... | ..... |

FIG. 4

| REPRODUCTION MODE / APPLICATION | 1X SPEED | 2X SPEED | 3X SPEED | ..... |
|---|---|---|---|---|
| WAIT | 1 | 2 | 3 | ..... |
| WEB BROWSING | 2 | 4 | 6 | ..... |
| MAIL | 1 | 3 | 4 | ..... |
| ..... | ..... | ..... | ..... | ..... |

INFORMATION PROCESSING APPARATUS AND A CELLULAR PHONE

BACKGROUND OF THE INVENTION

1. Field of the Invention

The present invention relates to an information processing apparatus and a cellular phone appropriate for reproduction of music on a mobile telephone, for example.

2. Description of Related Art

In recent years, there are spreading silicon audio players and portable audio players with external detachable memory on the market. In accordance with this trend, the digital audio reproduction function is provided for some models of commercially available cellular phones.

It is known that the digital audio reproduction function for cellular phones decompresses (decodes) encoded data generated from linear PCM (Linear Pulse Code Modulation) data encoded by audio compression technologies such as MPEG1 Layer3 (Moving Picture Image Coding Experts Group 1-Layer 3:MP3) and ATRAC3 (Adaptive Transform Acoustic Coding 3). Actually, the digital audio reproduction function is implemented by a control process of a CPU (Central Processing Unit) and a decode process of a DSP (digital signal processor).

The digital audio reproduction function further requires at least functions and specifications such as "reproduction", "stop", "reproduction time calculation", and "reproduction time display". The above-mentioned command processes such as "reproduction" and "stop" are available as handshake processes and therefore need to interchange commands between both. On the other hand, either CPU or DSP can process "reproduction time calculation"

The above-mentioned digital audio reproduction function has typically two methods, i.e., first and second methods of performing "reproduction time calculation".

According to the first method, the CPU counts frames and multiplies the reproduction time per frame by the count value to calculate the reproduction time. The frame is a single data unit for encoded data (bit stream). Encoding and decoding are performed in units of frames.

According to the second method, the DSP decodes frames. Each time the DSP completes decoding one frame, the DSP sends notification to the CPU to indicate that decoding of that frame has been completed. The CPU counts notifications from the DSP about completion of decoding one frame and multiplies the reproduction time per frame by the count value to calculate the reproduction time.

Japanese Non-examined Patent Publication No. 9-27187 (patent document 1) discloses the technology for finding the audio reproduction time. The apparatus according to this technology transfers coded signals read from a disk medium to the buffer memory. The apparatus decodes the coded signals read from the buffer memory and outputs audio data. In this apparatus, the buffer memory is provided with a time table to indicate sector sizes from the beginning of the disk. The reproduction time is found based on the time table.

[Patent document] Japanese Non-examined Patent Publication No. 9-27187 (FIG. 1)

An ordinary portable audio player can use the entire CPU throughput for the audio reproduction. The realtime capability for the digital audio reproduction is not influenced by a choice between the above-mentioned first and second methods for "reproduction time calculation".

However, a cellular phone has the telephone call function, i.e., the most important function whose realtime capability must be always ensured. For example, there may be a mixture of tasks for the telephone call protocol process and tasks associated with the digital audio reproduction process. In such case, tasks for the digital audio reproduction process must be less prioritized than tasks for the telephone call protocol process.

In other words, when the digital audio reproduction function is performed in such multitask process, an attempt must be made to minimize loads on CPU processes associated with the audio reproduction. Otherwise, the realtime capability may not be ensured during the audio reproduction. Especially, according to the above-mentioned second method considering an overhead for changing tasks, the CPU may not be able to realtime receive the time notification from the DSP. In this case, the reproduction time is displayed incorrectly.

SUMMARY OF THE INVENTION

The present invention has been made in consideration of the foregoing. It is therefore an object of the present invention to provide an information processing apparatus and a cellular phone capable of accurately calculating a process time for a specified information process such as an audio reproduction process in a case where there is a mixture of a specified task process associated with the audio reproduction process, for example, and a highly prioritized task process such as a telephone call protocol process.

The information processing apparatus according to the present invention solves the above-mentioned problems by comprising: task execution means capable of simultaneously performing a plurality of task processes including a specified task process using reproduction time information during a specified information reproduction process; and information reproduction process execution means for performing a specified information reproduction process and changing timing to notify the task execution means of reproduction time information about the information reproduction process in accordance with a load on the specified task process.

The information reproduction process execution means performs the information reproduction process on the basis of specified process units provided with sequential numbers and calculates the reproduction time information based on a process time needed for an information reproduction process per unit process and a number of a process unit which performed an information reproduction process.

The task execution means determines a load of the specified task process based on a reproduction speed of the information reproduction process and/or a type of another task process executing simultaneously with the specified task process and makes notification to the information reproduction process execution means.

The cellular phone according to the present invention solves the above-mentioned problems by comprising: telephone call means for at least making a wireless telephone call; task execution means capable of simultaneously performing a plurality of task processes including a specified task process using reproduction time information during a specified information reproduction process and a task process associated with a wireless telephone call; and information reproduction process execution means for performing a specified information reproduction process and changing timing to notify the task execution means of reproduction time information about the information reproduction process in accordance with a load on the specified task process.

When the task execution means is notified of the reproduction time information about the information reproduction process according to the present invention, the notification timing is changed in accordance with loads on the specified task process. Even when the task execution means performs another task process simultaneously with the specified task process, the task execution means can accurately perform the specified task process.

According to the present invention, the information reproduction process execution means changes a timing to notify the task execution means of the reproduction time information about the information reproduction process in accordance with loads on the specified task process. For example, a DSP as an instance of the information reproduction process execution means performs an information reproduction process such as an audio reproduction process. A CPU as an instance of the task execution means performs display control of the reproduction time for the information reproduction process. In such case, the task process to display the audio reproduction time may mix with a highly prioritized task process such as a telephone call protocol process. Nevertheless, it becomes possible to accurately calculate and display the audio reproduction time.

BRIEF DESCRIPTION OF THE DRAWINGS

FIG. 3 is a table showing reproduction notification time intervals corresponding to reproduction modes used for a CPU of the cellular phone according to the embodiment to set reproduction notification intervals;

FIG. 4 is a table showing reproduction notification time intervals corresponding to reproduction modes and applications used for the CPU of the cellular phone according to the embodiment to set reproduction notification intervals;

DETAILED DESCRIPTION OF THE PREFERRED EMBODIMENTS

An embodiment of the present invention will be described in further detail with reference to the accompanying drawings. The following description uses a cellular phone as the embodiment of the present invention.

[Configuration of Major Parts in the Cellular Phone]

Figure 1:
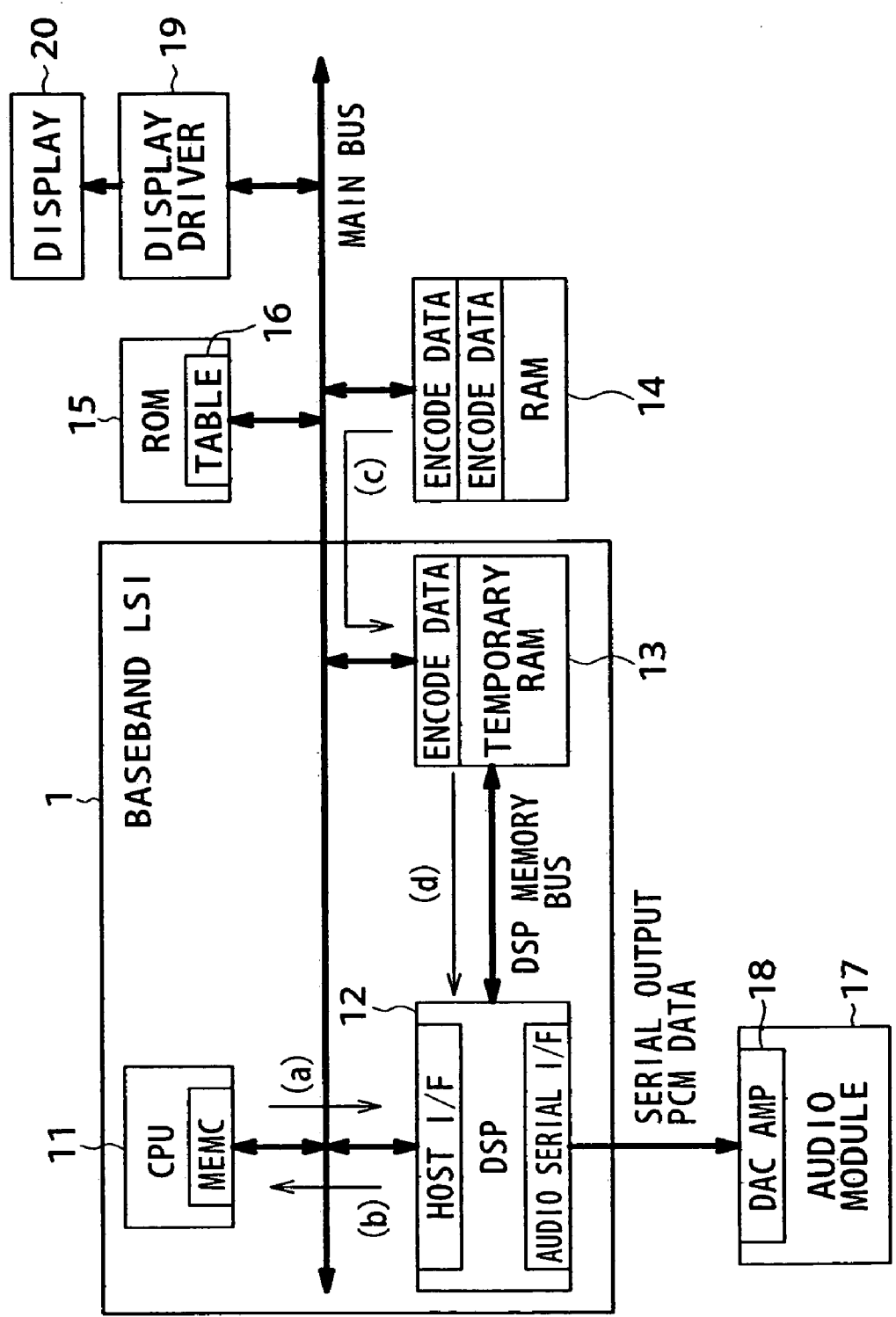
FIG. 1 is a block circuit diagram showing the internal configuration of major parts in a cellular phone according to an embodiment of the present invention.

FIG. 1 shows the internal configuration of major parts in the cellular phone according to the embodiment of the present invention. FIG. 1 omits components used for an ordinary cellular phone such as a radio signal transmission/reception circuit comprising an antenna, a high-frequency circuit, and the like, a speaker, a microphone, and accompanying amplifier, analog/digital converter, and digital/analog converter, for example, an interface to connect a headphone, an interface to connect external memory and external apparatuses, and the like.

In FIG. 1, the cellular phone according to the embodiment chiefly comprises hardware modules such as a CPU 11, a DSP 12, temporary RAM 13, RAM 14, and ROM 15. These modules are connected to each other via a main bus. The CPU 11, the DSP 12, and the temporary RAM 13 are provided in a baseband LSI that performs baseband processes.

An audio module 17 comprises a digital/analog converter (DAC), a head amplifier (AMP) 18, a headphone interface (not shown), and the like. The audio module 17 outputs audio signals from the DSP 12 to the headphone and the like.

A display 20 is a display device to display telephone numbers, standby screens, Web images, mail messages, and the like. During the digital audio reproduction, the display 20 also displays the reproduction time. The cellular phone according to the embodiment may have two displays, i.e., a main display and a sub-display. The sub-display may display the reproduction time.

A display driver 19 drives the display 20 based on display signals from the CPU 11 to display images on the display 20.

The CPU 11 corresponds to task execution means of the present invention. The CPU 11 performs control and operation processes concerning various functions of ordinary cellular phones and control and operation processes of various applications during execution. Further, the CPU 11 performs various tasks such as control in response to requests from a user during digital audio reproduction according to the embodiment of the present invention, e.g., control over the modules in response to requests such as "reproduction" and "stop". The CPU 11 according to the embodiment also provides control to set any interval (hereafter referred to as a reproduction time notification interval) at which the DSP 12 notifies the reproduction time information to the CPU 11. In addition, the CPU 11 also performs a given task process for control to display the reproduction time on the display 20 based on the reproduction time information notified from the DSP 12. Control to set the reproduction time notification interval will be described in more detail later.

The DSP 12 corresponds to information reproduction process execution means of the present invention. The DSP 12 has the function of performing not only various operation processes for the signal transmission/reception function in ordinary cellular phones, but also a decoding process for encoded data during the digital audio reproduction as an example of the specified information reproduction process according to the present invention. The DSP 12 is configured to be able to perform decoding processes corresponding to various reproduction modes such as not only the normal 1× reproduction, but also, for example, 2× and 3× forward reproductions, and 1×, 2×, and 3× backward reproductions. After the DSP 12 performs the decoding process to generate PCM audio data, this data is transmitted to the audio module 17 via an audio serial interface (I/F). In addition, the DSP 12 according to the embodiment has a function of multiplying the number of the decoded frame by the reproduction time per frame to calculate the reproduction time and a function of sending the reproduction time information to the CPU 11 at the above-mentioned reproduction time notification interval. The reproduction time calculation process and a process of transmitting the reproduction time information to the CPU 11 will be described later in more detail.

The ROM 15 stores: control and operation programs (including the control program for digital audio reproduction) for the CPU 11 to control the respective parts and perform various operations; various initialization values, programs and dictionary data, a telephone number for the cellular phone, and font data for character input processes; a table 16 maintaining correspondence among reproduction modes, applications, and reproduction notification time intervals; various application programs installed in the cellular phone; and identification information (ID) of the cellular phone. The ROM 15 includes rewritable ROM such as EEPROM. The ROM 15 is configured to be able to update and save electronic mail data, user-specified address books and electronic mail addresses, downloaded photo data and call termination sound data, the above-mentioned table 16, and various user-specified values.

The RAM 14 functions as a work area for the CPU 11 and the DSP 12 to perform various data processes and stores data as needed. When the digital audio reproduction is performed in the embodiment, the RAM 14 also stores encoded audio data previously supplied from external memory, external devices, and the like.

The temporary RAM 13 temporarily stores encoded data stored in the RAM 14 when the DSP 12 decodes encoded audio data.

In FIG. 1, paths (a) and (b) indicate routes between the CPU 11 and the DSP 12 for sending and receiving commands. The paths (a) and (b) are used to send and receive a command such as "reproduction" and its response.

A path (c) in FIG. 1 shows a path to transfer encoded data from the RAM 14 to the temporary RAM 13. A memory controller (MEMC) of the CPU 11 controls the transfer of encoded data from the RAM 14 to the temporary RAM 13 via the path (c). Specifically, when receiving a temporary RAM empty request from the DSP 12, the CPU 11 reads encoded data from the RAM 14 and transfers it to the temporary RAM 13 via the main bus.

When the DSP 12 decodes encoded audio data, a path (d) in FIG. 1 indicates a route to transfer the encoded data from the temporary RAM 13 to a work RAM in the DSP. According to the embodiment, the DSP 12 and the temporary RAM 13 are connected with each other via the DSP memory bus. The path (d) is used to transfer encoded data via the DSP memory bus.

[Control Sequence During Audio Reproduction]

Figure 2:
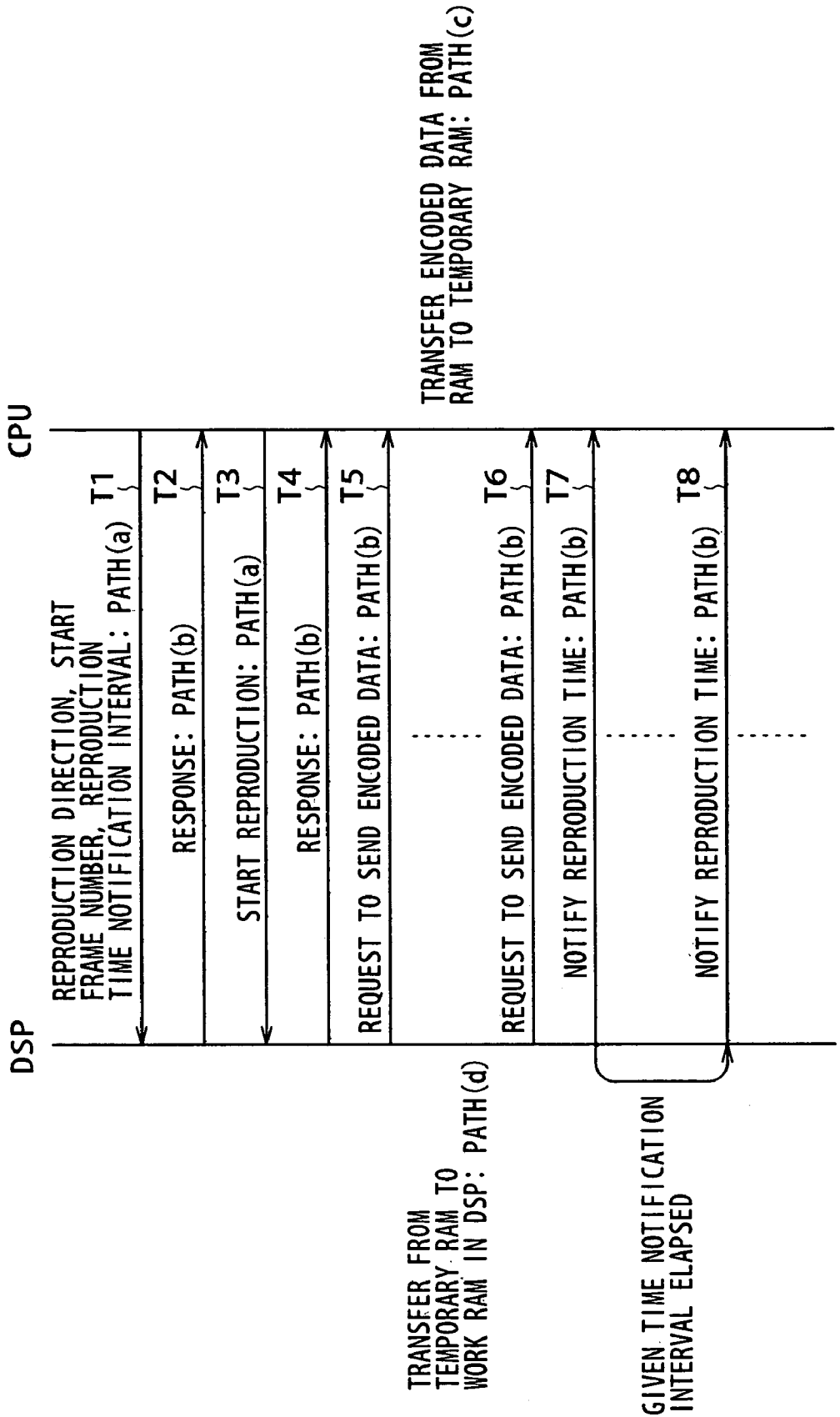
FIG. 2 is a time flowchart used for the description of a control sequence when the cellular phone according to the embodiment starts audio reproduction.

FIG. 2 shows a control sequence when the cellular phone according to the embodiment starts audio reproduction.

In FIG. 2, the CPU 11 first performs a process T1 and uses the path (a) in FIG. 1 to notify the DSP 12 of various information such as reproduction directions (backward and forward directions), the frame number to start reproduction, and the reproduction time notification interval.

The information about reproduction direction represents a backward direction during the fast backward reproduction and represents a forward direction during the fast forward reproduction or the normal reproduction 1× reproduction), and the like. The information about the frame number to start reproduction indicates the number of a frame to start the decoding process. The frame number is counted from the beginning of an audio file. When the audio file is reproduced from the first frame, the frame number is set to "1". When the audio file is reproduced in the middle (resume reproduction), the frame number represents a specified number of a frame to be reproduced in the middle. As will be described later in more detail, information about the reproduction notification time interval is equivalent to setup information showing at which interval converted into the reproduction time the DSP 12 notifies the CPU 11 of the reproduction time information. When the reproduction notification time interval is set to "1", for example, the DSP 12 notifies the CPU 11 of the reproduction time information every lapse of one second as converted into the reproduction time.

When receiving these pieces of information, the DSP 12 performs a process T2 and uses the path (b) in FIG. 1 to return a response to the CPU 11. When receiving the response to the process T2 from the DSP 12, the CPU 11 performs a process T3 and uses the path (a) in FIG. 1 to send a reproduction start command to the DSP 12. When receiving the reproduction restart command, the DSP 12 performs a process T4 and uses the path (b) to return the response. The DSP 12 then performs processes T5 and T6 to send a transmission request for encoded data to the CPU 11.

When receiving the transmission request for the encoded data, the CPU 11 transfers the encoded data from the RAM 14 to the temporary RAM 13 via the path (c) in FIG. 1. At this time, the DSP 12 transfers encoded data corresponding to the reproduction direction predetermined in the CPU 11 from the temporary RAM 13 to the work RAM in the DSP via the path (d) in FIG. 1

The DSP 12 periodically performs the decoding processes for the encoded data and further performs an empty request for encoded data. The DSP 12 performs processes T7 and T8 to notify the CPU 11 of the reproduction time information every reproduction time notification interval specified by the CPU 11.

[Process to Display the Reproduction Notification Time Interval and the Time Information]

The following describes in detail a cycle to notify the reproduction time information from the DSP 12 to the CPU 11, i.e., a process to display the reproduction notification time interval and the time information.

According to the embodiment, the CPU 11 configures the reproduction time notification interval based on information in the table 16. For example, the table 16 in FIG. 3 shows reproduction notification time intervals corresponding to reproduction modes. The table 16 in FIG. 4 shows reproduction notification time intervals corresponding to reproduction modes and applications. The CPU 11 sends information about the configured reproduction time notification interval to the DSP 12.

The examples in FIGS. 3 and 4 show only correspondence among forward reproduction modes and reproduction time notification intervals for simplicity. Of course, the table 16 also registers correspondence among backward reproduction modes and reproduction time notification intervals.

When the table 16 in FIG. 3 is referenced from the ROM 15, for example, the CPU 11 sets the reproduction time notification interval to "1" for 1× speed reproduction as the reproduction mode; to "2" for 2× speed reproduction; and to "3" for 3× speed reproduction. When assigned with the reproduction time notification interval in this manner, the DSP 12 transmits the reproduction time information calculated during the decoding process to the CPU 11 at the specified reproduction time notification interval.

When the reproduction time notification interval is set based on the table 16 in FIG. 3, a variable speed reproduction operation, in particular, causes a longer interval to an interrupt process for the CPU 11 to display the time information on the display 20 than that to the 1× speed reproduction. As a result, the CPU 11 is supplied with decreased processing loads.

Figure 5:
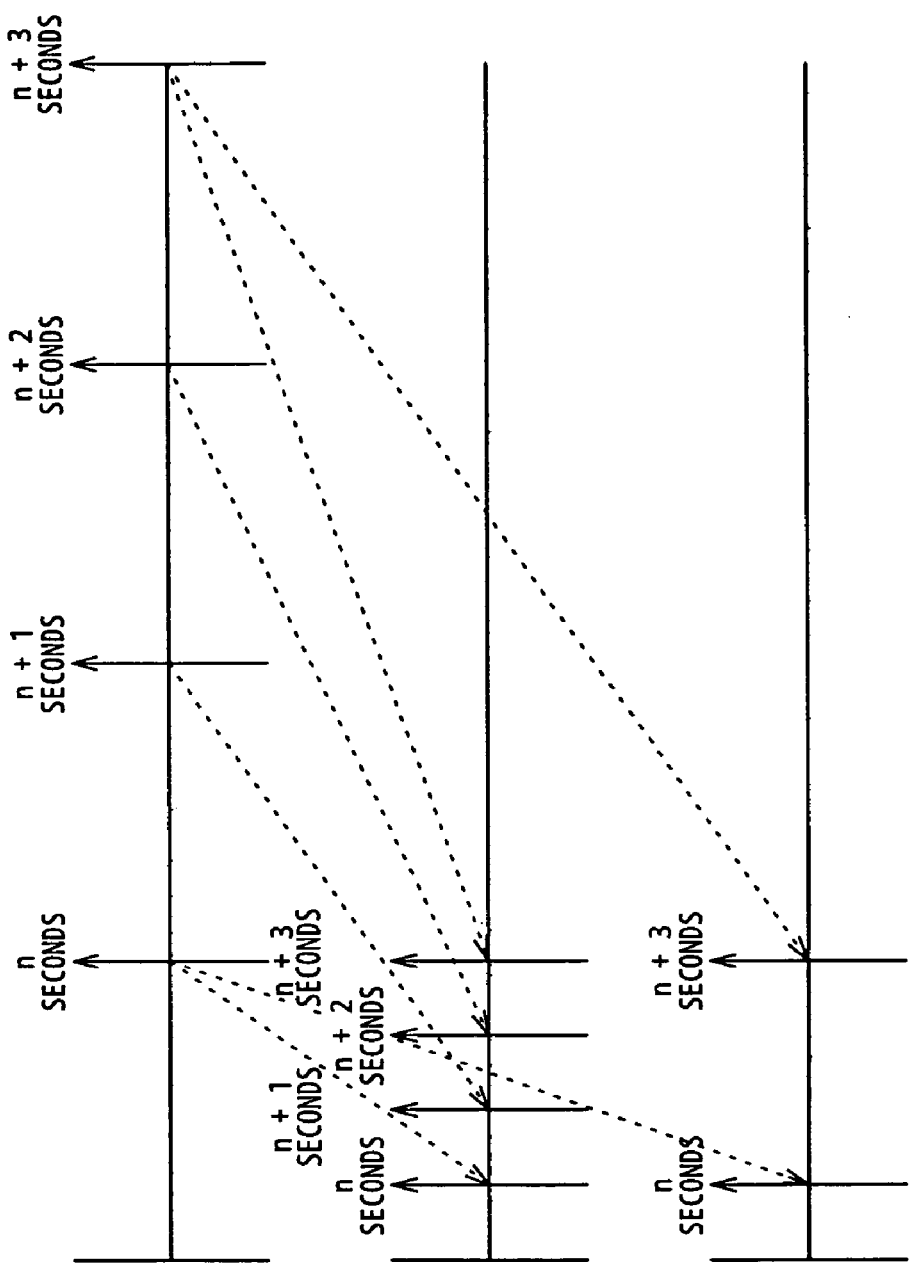
FIG. 5 is used to describe the relationship between increase and decrease in CPU process loads. depending on reproduction notification time intervals at Nx speed.

Examples will be described with reference to FIG. 5. During the 1× speed reproduction as shown in (A) of FIG. 5, for example, the DSP 12 sends the reproduction time information every second converted into the reproduction time. To this extent, the CPU 11 is not so heavily burdened with process loads. On the other hand, during the N× speed reproduction as shown in (B) of FIG. 5, it is assumed that the DSP 12 sends the reproduction time information to the CPU 11 every second converted into the reproduction time. In this case, the CPU 11 must perform a process of displaying the reproduction time from a plurality of pieces of reproduction time information in a second. The CPU 11 is burdened with increased process loads. If a multitask process is needed in such case, the CPU 11 may not be able to correctly display the time. By comparison, during the N× speed reproduction as shown in (C) of FIG. 5, providing a long reproduction time notification interval also extends an interval of the interrupt process for the CPU 11 to display the time information on the display 20. This alleviates an increase in process loads on the CPU 11. If a multitask process is needed for the example of (C) in FIG. 5, the CPU 11 can process the tasks and provide control to correctly display the time.

As shown in FIG. 4, the cellular phone according to the embodiment of the present invention can configure the reproduction time notification interval based on the information from the table 16 of reproduction notification time intervals corresponding to reproduction modes and applications. This makes it possible to decrease process loads on the CPU 11 in consideration for not only reproduction modes, but also the amount of loads due to application execution, i.e., the amount of loads according to task types.

Using the table 16 in FIG. 4, the CPU 11 sets the reproduction time notification interval to "1" for the 1× speed reproduction as the reproduction mode, to "2" for the 2× speed reproduction, or to "3" for the 3× speed reproduction when, for example, an active application causes lightly loaded processes such as displaying standby screens. The CPU 11 sets the reproduction time notification interval to "2" for the 1× speed reproduction as the reproduction mode, to "4" for the 2× speed reproduction, or to "6" for the 3× speed reproduction when, for example, an active application causes heavily loaded processes such as Web browsing. The CPU 11 sets the reproduction time notification interval to "1" for the 1× speed reproduction as the reproduction mode, to "3" for the 2× speed reproduction, or to "4" for the 3× speed reproduction when, for example, an active application causes relatively heavily loaded processes such as electronic mailing.

When the reproduction time notification interval is configured based on the table 16 in FIG. 4, it becomes possible to appropriately change intervals of the interrupt process for the CPU 11 to display the time information on the display 20 in accordance with not only the reproduction modes, but also the amounts of process loads on the applications. As a result, process loads on the CPU 11 can be decreased. Consequently, the CPU 11 can correctly display the time.

[Timings for the Decoding Process and the Reproduction Time Calculation Process in the DSP]

Figure 6:
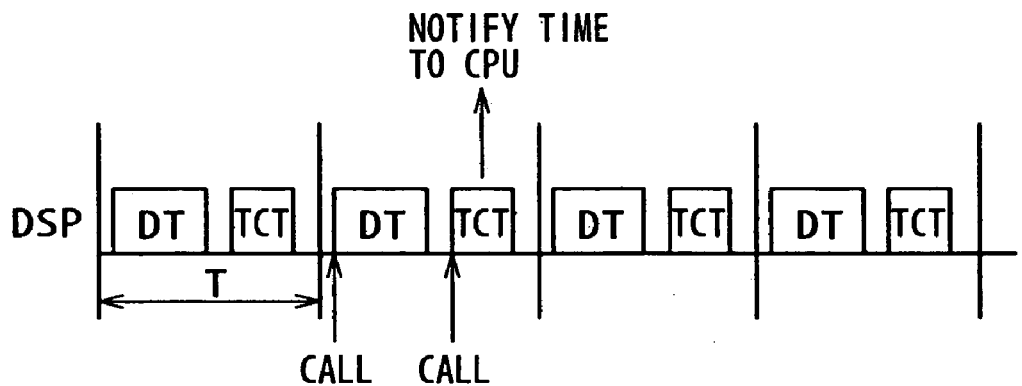
FIG. 6 is used to describe timings of a decoding process and a reproduction time calculation process in the DSP.

FIG. 6 shows timings for the decoding process and the reproduction time calculation process in the DSP 12. In FIG. 6, DT signifies a decode task, TCT a reproduction time calculation task, and T a decode cycle per frame (T=(1/Fs) *samples/frame, where Fs is the sampling frequency).

In FIG. 6, the DSP 12 periodically performs the decoding, process at the decode cycle T per frame as the reference. Specifically, the DSP calls a task to periodically perform the decoding process from the OS (Operating System) based on a timer (not shown) in the DSP 12. The reproduction time calculation process is performed after the decode task is called from the OS. The reproduction time calculation process multiplies the frame number by the reproduction time per frame to calculate the current reproduction time after which the decoding process has been completed. The DSP 12 notifies the CPU 11 of the reproduction time information at the reproduction time notification timing based on the reproduction time notification interval predetermined by the CPU 11 as mentioned above.

[Reproduction Time Calculation Algorithm]

Figure 7:
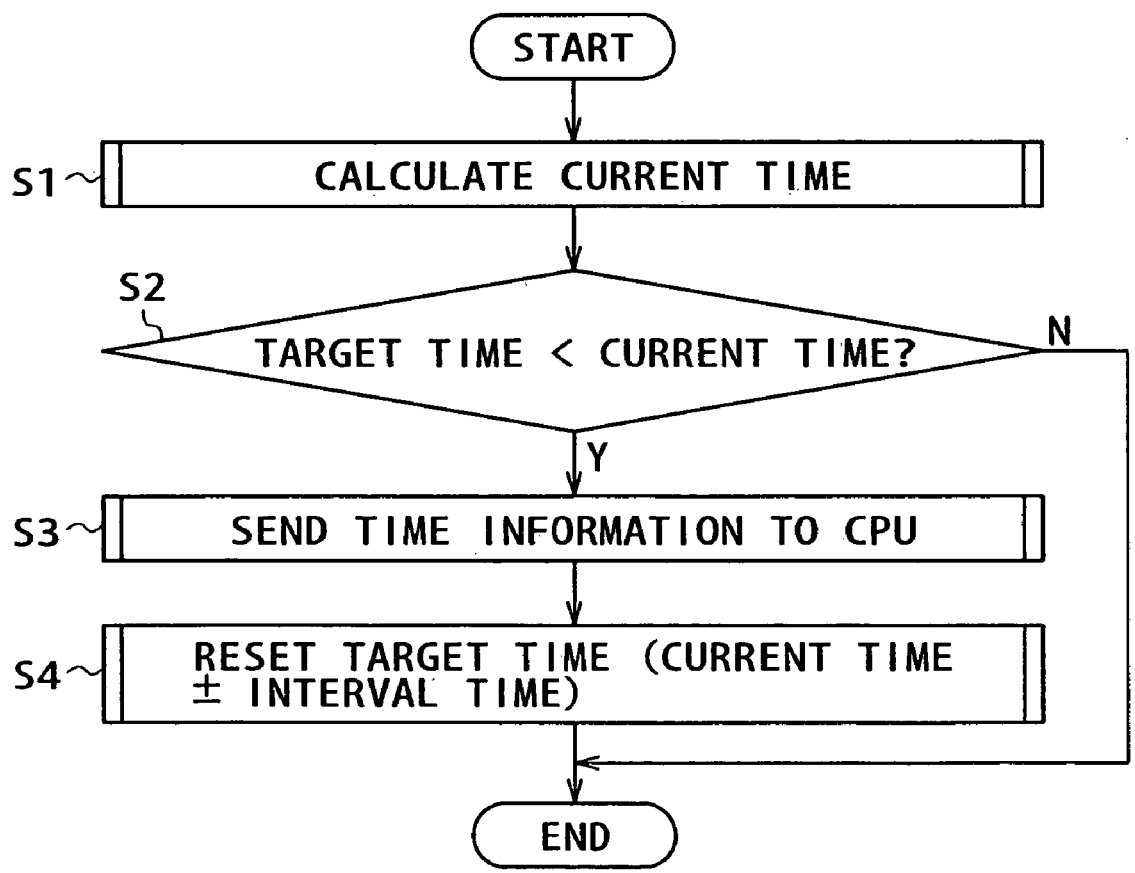
FIG. 7 is a flowchart used to describe a reproduction time calculation algorithm in a DSP of a cellular phone according to the embodiment.

FIG. 7 shows an algorithm to calculate the reproduction time in the DSP 12.

Before the audio reproduction starts in FIG. 7, the DSP 12 calculates a time (hereafter referred to as a target time) to notify the CPU 11 of the reproduction time according to the reproduction direction (backward or forward), the frame number to start the reproduction, and the reproduction time notification interval (specifically referred to as an interval time in FIG. 7).

When the audio reproduction starts, the DSP 12 performs the process at step S1. That is to say, the DSP 12 multiplies the frame number of the completely decoded frame by the reproduction time per frame to calculate the current reproduction time (hereafter referred to as the current time).

As the process at step S2, the DSP 12 then compares the current time with the target time. As the process at step S3, the DSP 12 notifies the CPU 11 of the current time the moment that the condition (target time<current time) is satisfied during the forward reproduction or the moment that the condition (target time>current time) is satisfied during the backward reproduction. When neither condition is satisfied, the DSP 12 makes no notification to the CPU 11.

When notifying the CPU 11 of the current time at step S3, the DSP 12, as the process at step S4, reconfigures the target time to be notified to the CPU 11. That is to say, the DSP 12 reconfigures the target time for the forward reproduction by performing the calculation of (new target time=old target time+interval time). The DSP 12 reconfigures the target time for the backward reproduction by performing the calculation of (new target time=old target time−interval time).

The DSP 12 performs these processes at the decoding process cycle. According to the embodiment, the DSP 12 calculates the reproduction time to enable a decrease in process loads on the CPU 11 during the audio reproduction and accurate time calculation independent of the reproduction directions.

[Conclusion]

As mentioned above, even if a multitask operation is needed, the embodiment enables calculation of the audio reproduction time independently of task priorities. Accordingly, the display 20 can correctly display the reproduction time.

Even if there is a need for special reproductions such as the fast forward reproduction and the fast backward reproduction, the embodiment can constantly calculate and display the reproduction time.

The embodiment can also configure the reproduction time notification interval in consideration for the application's process amount, for example. Accordingly, the embodiment can calculate and display the reproduction time even when execution of the application changes traffic situations of the main bus.

Even when the reproduction time notification interval is changed at discretion, the embodiment enables the CPU 11 to continue performing the normal process flow and eliminates the need to newly provide a special process flow.

According to the embodiment, the DSP 11 calculates the reproduction time. The CPU 11 need not count frames at the beginning of decoding or during execution of the decoding. Accordingly, the CPU 11 just needs to unchangedly transfer the encoded data stored in the RAM 14 to the temporary RAM 13.

Consequently, the embodiment can decrease process loads on the CPU 11 during audio reproduction and maintain the realtime capability during audio reproduction.

Since the DSP 11 calculates the reproduction time according to the embodiment, it is possible to limit a difference between the reproduced audio and the reproduction time only to a difference equivalent to the output buffer for the DSP 11.

The above-mentioned embodiment is described as an example of the present invention. Accordingly, the present invention is not limited to the embodiment. It is to be distinctly understood that various changes and modifications may be made in the present invention according to designs and the like without departing from the spirit and scope thereof.

The embodiment is not limited to the cellular phone. The embodiment can be also applied to various information processing apparatuses that may allow a mixture of the audio reproduction process and another more highly prioritized information process. The information processing apparatuses can accurately calculate the reproduction time during the audio reproduction process.

According to the embodiment, the CPU 11 configures the reproduction time notification interval based on the information of the table 16 stored in the RAM 15. For example, the reproduction time notification interval may be varied at discretion and dynamically in accordance with traffic situations of the main bus during the audio reproduction.

While the embodiment has described the audio reproduction as an example, the present invention can be also applied to calculation and display of the reproduction time during video reproduction.

What is claimed is:

1. An information processing apparatus comprising:
    task execution means capable of simultaneously performing a plurality of task processes including a specified task process using reproduction time information during a specified information reproduction process; and
    information reproduction process execution means for performing a specified information reproduction process and changing timing to notify said task execution means of reproduction time information about said information reproduction process in accordance with a load on said specified task process performed by said task execution means.

2. The information processing apparatus according to claim 1,
    wherein said information reproduction process execution means has reproduction time information calculation means for performing said information reproduction process on the basis of specified process units provided with sequential numbers and calculating said reproduction time information based on a process time needed for an information reproduction process per unit process and a number of a process unit which performed an information reproduction process.

3. The information processing apparatus according to claim 1,
    wherein said task execution means has load notification means for determining a load of said specified task process based on a reproduction speed of said information reproduction process by said information reproduction process execution means and making notification to said information reproduction process execution means.

4. The information processing apparatus according to claim 1,
    wherein said task execution means has load notification means for determining a load on said specified task process based on a type of another task process executing simultaneously with said specified task process and making notification to said information reproduction process execution means.

5. The information processing apparatus according to claim 1,
    wherein said task execution means has load notification means for determining a load on said specified task process based on a reproduction speed of said information reproduction process by said information reproduction process execution means and a type of another task process executing simultaneously with said specified task process and making notification to said information reproduction process execution means.

6. A cellular phone comprising:
    telephone call means for at least making a wireless telephone call;
    task execution means capable of simultaneously performing a plurality of task processes including a specified task process using reproduction time information during a specified information reproduction process and a task process associated with a wireless telephone call; and
    information reproduction process execution means for performing a specified information reproduction process and changing timing to notify said task execution means of reproduction time information about said information reproduction process in accordance with a load on said specified task process performed by said task execution means.

* * * * *

UNITED STATES PATENT AND TRADEMARK OFFICE
CERTIFICATE OF CORRECTION

PATENT NO.       : 7,647,067 B2
APPLICATION NO. : 10/995854
DATED            : January 12, 2010
INVENTOR(S)      : Takashi Fujioka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1450 days.

Signed and Sealed this

Twenty-eighth Day of December, 2010

David J. Kappos
*Director of the United States Patent and Trademark Office*